(12) United States Patent
Gramling et al.

(10) Patent No.: US 7,954,370 B2
(45) Date of Patent: Jun. 7, 2011

(54) USE OF PIEZOELECTRIC SENSOR ATTACHED TO ELECTRONICS PACKAGE HOUSING

(75) Inventors: Frank E. Gramling, Simpsonville, SC (US); Jay C. Sinnett, Greenville, SC (US); Patrick A. Tyndall, Simpsonville, SC (US)

(73) Assignee: Michelin Recherche et Technique, Granges-Paccot (CH)

( * ) Notice: Subject to any disclaimer, the term of this patent is extended or adjusted under 35 U.S.C. 154(b) by 0 days.

(21) Appl. No.: 11/916,585

(22) PCT Filed: Jun. 10, 2005

(86) PCT No.: PCT/US2005/020698
§ 371 (c)(1),
(2), (4) Date: Jul. 10, 2008

(87) PCT Pub. No.: WO2006/135366
PCT Pub. Date: Dec. 21, 2006

(65) Prior Publication Data
US 2008/0289407 A1    Nov. 27, 2008

(51) Int. Cl.
*B60C 23/02* (2006.01)
(52) U.S. Cl. .......................................... 73/146.5; 73/146
(58) Field of Classification Search .................. None
See application file for complete search history.

(56) References Cited

U.S. PATENT DOCUMENTS

| | | | |
|---|---|---|---|
| 3,192,419 A * | 6/1965 | Beach ...................... 310/323.16 |
| 4,510,484 A | 4/1985 | Snyder | |
| 4,862,486 A | 8/1989 | Wing et al. | |
| 4,878,107 A * | 10/1989 | Hopper .......................... 257/415 |
| 5,457,447 A | 10/1995 | Ghaem et al. | |
| 5,562,787 A | 10/1996 | Koch et al. | |
| 5,573,610 A | 11/1996 | Koch et al. | |
| 5,573,611 A * | 11/1996 | Koch et al. ................. 152/152.1 |
| 5,749,984 A | 5/1998 | Frey et al. | |
| 5,869,189 A | 2/1999 | Hagood, IV et al. | |
| 6,048,622 A | 4/2000 | Hagood, IV et al. | |
| 6,438,193 B1 * | 8/2002 | Ko et al. ...................... 377/24.1 |
| 6,688,353 B1 * | 2/2004 | Koch .......................... 152/152.1 |
| 6,725,713 B2 * | 4/2004 | Adamson et al. ............. 73/146.5 |
| 6,807,853 B2 * | 10/2004 | Adamson et al. ............... 73/146 |
| 7,076,998 B2 | 7/2006 | Bulst et al. | |

(Continued)

FOREIGN PATENT DOCUMENTS

EP         0689950 A2    1/1996

(Continued)

OTHER PUBLICATIONS

International Search Report and Written Opinion, Feb. 24, 2006.

(Continued)

*Primary Examiner* — Lisa M Caputo
*Assistant Examiner* — Jermaine Jenkins
(74) *Attorney, Agent, or Firm* — Dority & Manning, P.A.

(57) ABSTRACT

Disclosed ia an apparatus and methodology for detecting tire rotation by associating a piezoelectric sensor (250) with an enclosure housing (210) tire environment related sensors and electronics. The enclosure (210) may be mounted in a tire (1) in a location subject to multi-dimensional strain and a signal processor is employed to separate tire rotation information for other types of strain induced signals that may be produced by the piezoelectric sensor (250).

11 Claims, 3 Drawing Sheets

U.S. PATENT DOCUMENTS

| | | | |
|---|---|---|---|
| 7,096,727 B2 * | 8/2006 | Adamson et al. | 73/146 |
| 7,138,911 B2 * | 11/2006 | Tyndall | 340/447 |
| 7,183,937 B2 * | 2/2007 | Park et al. | 340/693.1 |
| 7,196,617 B2 * | 3/2007 | Sinnett et al. | 340/445 |
| 7,331,367 B2 * | 2/2008 | Koch et al. | 152/152.1 |
| 7,343,787 B2 * | 3/2008 | Oflaz | 73/146 |
| 7,504,764 B2 * | 3/2009 | Chang et al. | 310/339 |
| 7,532,957 B2 * | 5/2009 | Kuchler | 701/1 |

FOREIGN PATENT DOCUMENTS

| | | |
|---|---|---|
| FR | 2847373 A | 5/2004 |
| JP | 08067117 | 3/1996 |

OTHER PUBLICATIONS

Supplementary European Search Report for EP 05760374.8-2425, dated Jun. 18, 2009.

* cited by examiner

USE OF PIEZOELECTRIC SENSOR ATTACHED TO ELECTRONICS PACKAGE HOUSING

FIELD OF THE INVENTION

The present subject matter relates to the co-location of piezoelectric sensors with tire electronics packages. More particularly, the present subject matter relates to the association of piezoelectric sensors with housings containing other tire electronics circuitry.

BACKGROUND OF THE INVENTION

The incorporation of electronic devices with pneumatic tire structures yields many practical advantages. Tire electronics may include sensors and other components for obtaining information regarding various physical parameters of a tire, such as temperature, pressure, number of tire revolutions, vehicle speed, number of rotations at speed, temperature at speed and other physical and operational parameters as well as manufacturing information such as name of manufacturer, manufacturing location, date of manufacture, etc. Such performance information may become useful in tire monitoring and warning systems, and may even potentially be employed with feedback systems to regulate proper tire pressure levels. For example, differences in tire rotational speed on the same vehicle may be indicative of under or over inflation as the diameter of a tire will change slightly with inflation pressure.

U.S. Pat. No. 5,749,984 (Frey et al.) discloses a tire monitoring system and method that is capable of determining such information as tire deflection, tire speed, and number of tire revolutions. Another example of a tire electronics system can be found in U.S. Pat. No. 4,510,484 (Snyder), which concerns an abnormal tire condition warning system. U.S. Pat. No. 4,862,486 (Wing et al.) also relates to tire electronics, and more particularly discloses an exemplary revolution counter for use in conjunction with automotive and truck tires.

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning earth-mining equipment. Entire fleets of vehicles could be tracked using RF tag transmission, exemplary aspects of which are disclosed in U.S. Pat. No. 5,457,447 (Ghaem et al.).

Such integrated tire electronics systems have conventionally been powered by a variety of techniques and different power generation systems. Examples include mechanical features for generating energy from tire movement, non-rechargeable batteries, and scavenging RF beam power with an interrogation antenna in close proximity to a tire.

In accordance with the present subject matter, it is appreciated that certain advantages of piezoelectric materials have long been recognized. However, such technology is constantly improving, thus potentially affording applications that utilize piezoelectric materials with improved operating capabilities. Examples of relatively new advances in piezoelectric technology are provided in U.S. Pat. No. 5,869,189 (Hagood, IV et al.) and U.S. Pat. No. 6,048,622 (Hagood, IV et al.), directed to composites for structural control. The presently disclosed technology concerns further advances in piezoelectric technology such that a piezoelectric sensor may be combined with other or existing tire condition related electronic sensors and together can be integrated with a tire or wheel assembly.

The disclosures of all of the foregoing United States patents are hereby fully incorporated into this application for all purposes by reference thereto. While various implementations of piezoelectric sensor devices have been developed for use with tire electronic systems, and while various combinations of information have been wirelessly relayed from a tire or wheel assembly using conventional technologies, no design has emerged that generally encompasses all of the desired characteristics as hereafter presented in accordance with the subject technology.

SUMMARY OF THE INVENTION

In view of the recognized features encountered in the prior art and addressed by the present subject matter, an improved methodology for incorporating or associating piezoelectric sensors in or with tires and/or wheel assemblies has been developed.

In an exemplary configuration, tire or wheel rotation detection is added as a tire or wheel parameter detection capability to existing tire environment parameter detection. In one of its simpler forms, the present technology provides the capability of adding tire/wheel rotation detection to existing sensor systems by the addition of a single piezoelectric sensor to previously known sensor technology such as the Michelin Earthmover Management System (MEMS) platform.

A positive aspect of this type of device capability expansion is that additional tire parameter detection capability can be obtained by way of a single tire patch or sealed enclosure mounted on a tire patch without the need to provide plural patches. In accordance with aspects of certain embodiments of the present subject matter, methodologies are thus provided that reduce both installation time as well as device production and labor costs associated with tire sensor installation.

In accordance with certain aspects of other embodiments of the present subject matter, methodologies have been developed to replace-previously known separately supplied tire rotation sensors normally associated with locations close to the crown of a tire with tire rotation sensitive sensors collocated with other non-rotation sensitive devices in locations not normally associated with tire rotation monitoring.

In accordance with yet additional aspects of further embodiments of the present subject matter, apparatus and accompanying methodologies have been developed to protect tire rotation sensitive piezoelectric sensors from exposure to contamination inside the tire.

According to yet still other aspects of additional embodiments of the present subject matter, apparatus and methodologies have been developed to insure robust connections between sensors and associated electronic circuitry.

Additional objects and advantages of the present subject matter are set forth herein or will be apparent to those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
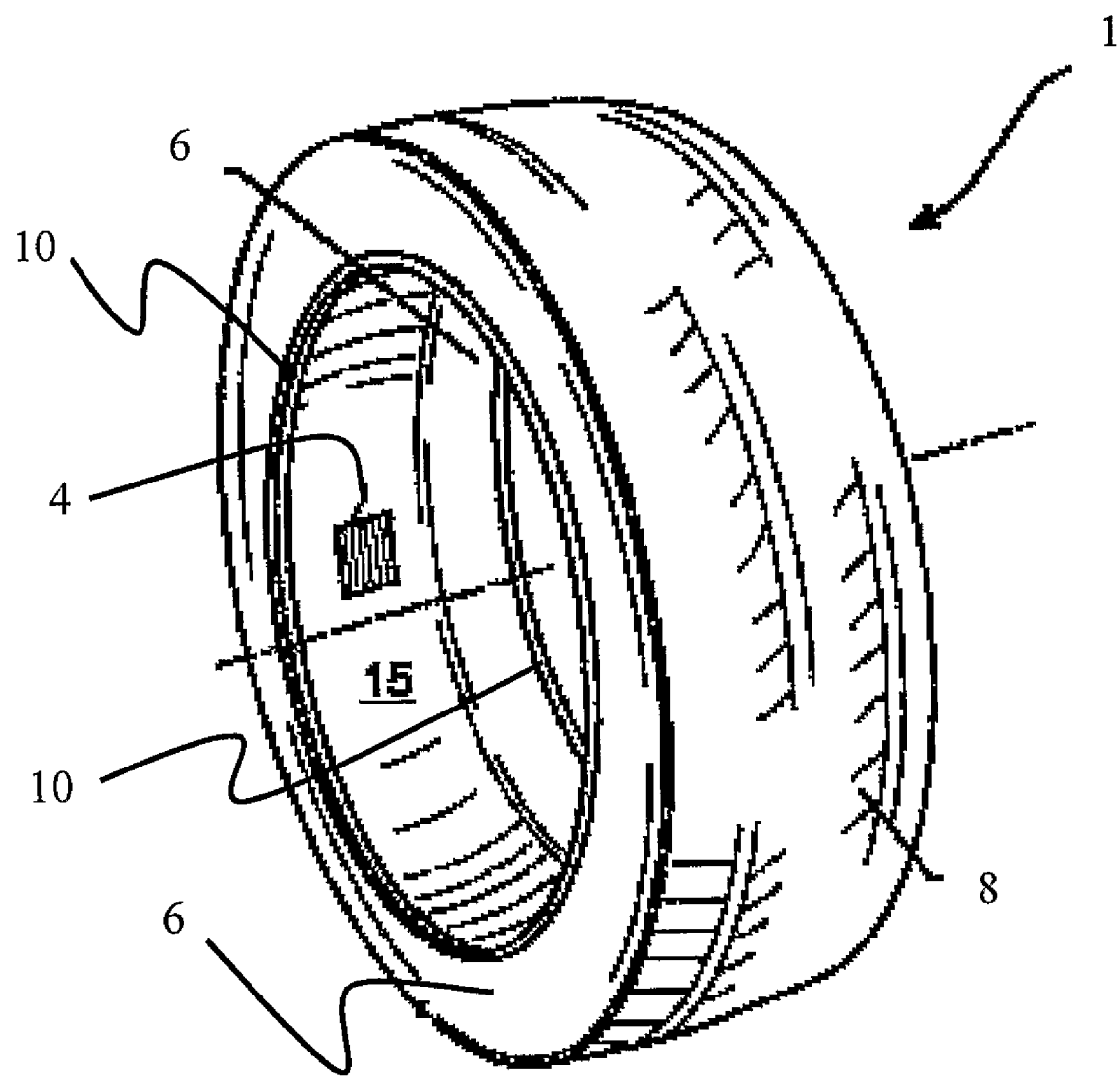
FIG. 1 displays a known arrangement for mounting a tire rotation sensor to the inner liner of a tire.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with the incorporation of tire rotation sensors within or associated with sealed enclosures previously used only to house temperature and pressure sensors and associated electronic circuitry for a Michelin Earthmover Management System (MEMS) patch. MEMS patches may be mounted internally of the tire on an internal sidewall portion of the tire and usually at prescribed distances from the lip of the bead of the tire. Such a location is not generally within the contact patch area of a tire, i.e. the portion of a tire that comes into contact with the surface over which the tire may roll. Previously, rotation sensitive sensors have been placed in the crown portion of a tire so as to, among other things, maximize the flexure to which the sensor is exposed upon tire rotation, thereby assisting in generating higher amplitude and, therefore, more easily detectable rotation signals.

In accordance with the present technology, it has been found that placement of piezoelectric sensors in or on the sealed enclosure normally housing MEMS sensors and electronics and despite the normal positioning of such enclosure away from the contact patch portion of a tire, there, never the less, is sufficient flexure reaching the piezoelectric sensor to provide usable tire rotation responsive signals. The signal generated by piezoelectric sensors placed on or in MEMS enclosures can be electronically conditioned to provide a signal that can indicate tire rotations and possibly other parameters including, for example, acceleration, and other motion related parameters.

An additional positive aspect of mounting tire rotation sensitive devices with the MEMS sensors and associated electronics flows from the inherited benefit of eliminating exposure of the piezoelectric tire rotation sensor to contamination inside the tire, especially chemical compounds intentionally placed inside the tire as protective mechanisms for the tire. In addition, co-locating the piezoelectric tire rotation sensor within the MEMS platform permits robust connection between the sensor and associated electronic circuits.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject piezoelectric tire rotation sensor mounting methodology and apparatus. Referring now to the drawings, FIG. 1 illustrates a known configuration for counting tire revolutions using an integrated self-powered piezoelectric device 4 provided within a tire or wheel assembly. More specifically, FIG. 1 depicts an exemplary perspective view of a pneumatic tire 1 characterized by a crown having an exterior tread portion 8, bead portions 10, and sidewall portions 6 extending between each tire bead 10 and the crown. An inner liner 15 is provided along the interior crown and sidewall surfaces, to which self-powered tire revolution counter 4 and/or other tire electronics may be mounted.

Mounting tire revolution counter 4 on the inner liner 15 of a tire and, in particular, in the crown area of the tire can provide a practical source of tire rotation signals but such location also opens various areas of concern when such tire rotation signals are to be associated with other tire environment sensor signals from other sensors. A first area of concern arises from the physical placement of an additional sensor device within a tire. Additional costs including labor expense for mounting the tire rotation sensor may be avoided or minimized if the tire rotation sensor is combined with existing sensors. The present technology addresses this concern by associating a tire rotation sensor with existing sensors in various manners as will now be more fully described.

Figure 2:
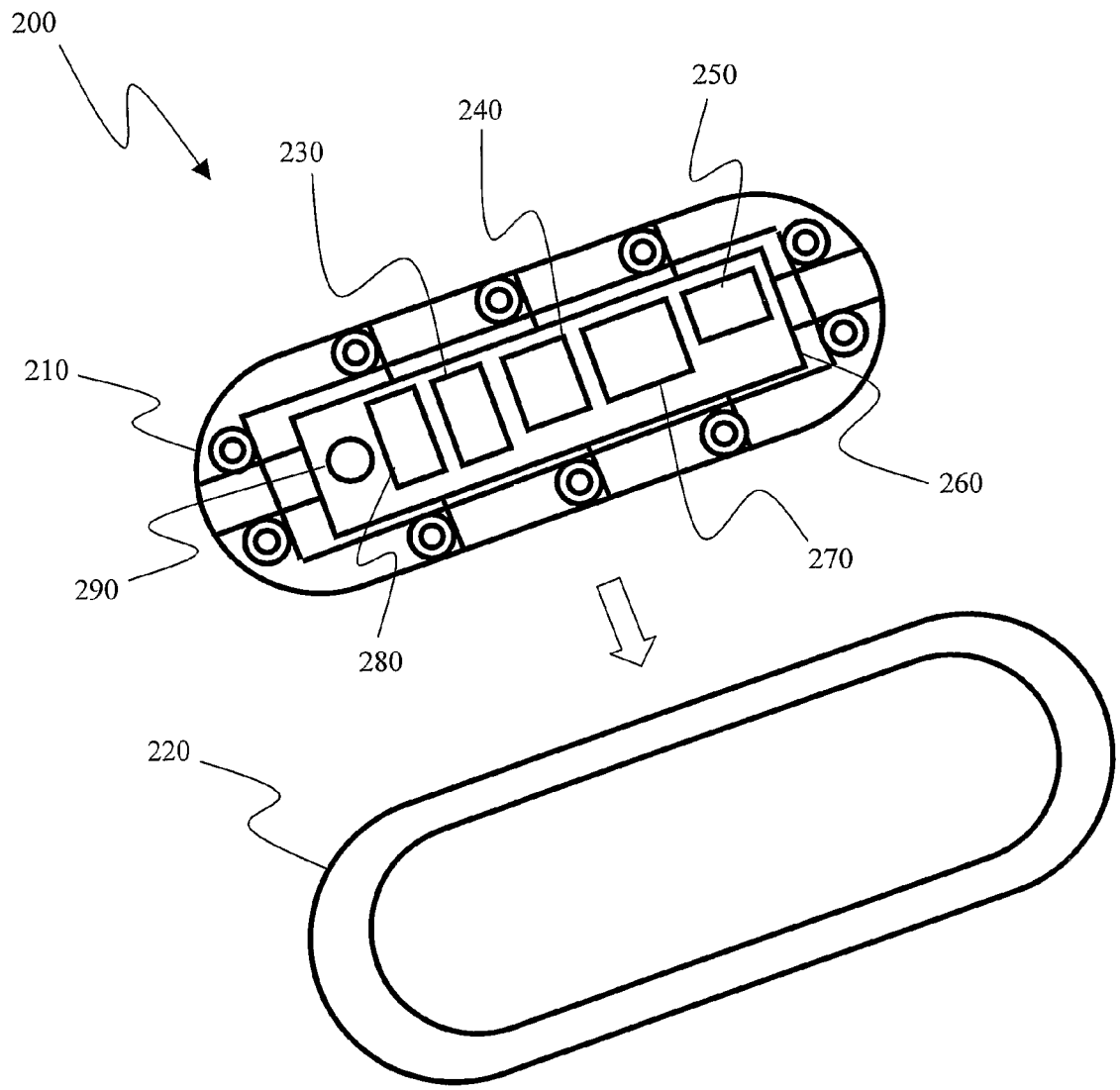
FIG. 2 illustrates an exploded view of a Michelin Earthmover Management System (MEMS) platform patch for supporting tire environment sensors including, in accordance with the present technology, a piezoelectric tire rotation sensor.

With reference now to FIG. 2, there is illustrated a Michelin Earthmover Management System (MEMS) platform patch 200 for supporting tire environment sensors including, in accordance with the present technology, a piezoelectric tire rotation sensor 250. It should be appreciated that, although the present discussion relates primarily to the MEMS environment, such is not a limitation of the present subject matter as the piezoelectric tire rotation sensor of the present technology may be combined with other tire environment sensors on a platform usable with many different types of tires and as such is not limited to the earthmover environment as illustratively discussed herein.

As is illustrated in FIG. 2, the MEMS platform patch 200 provides an enclosure 210 that may be encased within an elastomeric enclosure 220 for ease of attachment to the inner surface of a tire to be monitored. Tire environment sensors as well as associated other elements including, but not limited to, temperature sensor 230, pressure sensor 240, and additional components including, but not limited to, a wireless transmitter 270 and a microprocessor or microcontroller 280, either of which may include memory portions for storage of various forms of data, may be mounted on a printed circuit board 260 in enclosure 210 of the MEMS platform patch 200. A battery 290 may provide power required for operation of the MEMS platform patch circuitry.

In accordance with one embodiment of the present technology, tire rotations sensitive piezoelectric sensor 250 may also be mounted in enclosure 210 although other locations for the tire rotation sensitive piezoelectric sensor 250 are possible as will be discussed further later. As noted battery 290 may be employed as a power source for the MEMS platform patch 200 but other configurations are possible including providing a rechargeable battery, possibly charged from energy harvested from piezoelectric sensor 250. Alternatively all operating power for the MEMS platform patch 200 might be derived from piezoelectric sensor 250.

Within the present illustratively discussed earthmover environment, it has been found that one acceptable location for the patch 200 is a location about eight inches from the lip of the bead 10 of a tire 1. It should be understood, however, that such position is not a limitation of the present technology but merely represents one acceptable position for attachment of the patch 200.

In accordance with the present technology, it has been found that while previous tire rotation sensors may have been located in the contact patch area of a tire to maximize tire rotation sensor signal generation, co-locating such tire rotation sensors with the sensors of a MEMS platform device 200, never the less, provides an acceptable alternative. Locating the tire rotation piezoelectric sensor 250 in the currently used MEMS patch location subjects the sensor to multi-dimensional forces much more-so that the currently used tire rotation sensor location in the summit, however, deflection and other forces on the tire may still be transmitted through the patch 200 and enclosure 210 to the piezoelectric sensor 250. Such a force transmission path will change the signals generated by piezoelectric sensor 250, but such signals may then be electronically conditioned to provide a signal that can indicate tire rotation as well as other possible tire motion related parameters. Electronic signal conditioning of the signals from piezoelectric sensor 250 may be provided by way of a separate signal processor, for example, a digital signal processor (DSP), or the previously mentioned microprocessor or microcontroller that may already be associated with the MEMS platform device.

A second area of concern with the provision of tire environment sensitive sensors relates to issues raised because of the ongoing practice of including various chemicals within an inflated tire. Some of these chemicals are intended, among other things, to provide physical protection for the tire. Tire-Life®, a coolant, sealant, anti-oxidant, and rust inhibitor marketed by Fuller Brothers, Inc. of Olympia, Wash., is an example of such a chemical used in conjunction with tires and wheels associated with large vehicles in the earthmover category. A side effect of such chemicals, however, is that they act as contaminants with respect to included electronic sensors. Such contaminates may adversely effect operation of any sensors mounted within the tire. The present technology addresses this concern by providing methodologies for sealing piezoelectric tire rotation sensor 250 within an enclosure 210 previously provided for other tire environment sensors such as temperature sensor 230 and pressure sensor 240 as may be employed in the previously mentioned MEMS platform patch 200.

A third area of concern with the provision of tire environment sensitive sensors relates to issues involving coupling of signals from various sensors to the MEMS platform and/or to external interrogators. The MEMS platform 200 may be configured so that signals are transmitted on a continuous or intermittent basis from wireless transmission circuitry (not shown) associated with the tire installed MEMS enclosure 210 to a vehicle mounted receiver or alternatively to a hand-held interrogator or a drive by interrogator. Co-locating piezoelectric tire rotation sensor 250 with the MEMS platform significantly reduces signal-coupling problems when using the MEMS platform as the mechanism whereby tire rotation signals are conveyed to external receivers.

In accordance with the present technology, coupling of signals from piezoelectric tire rotation sensor 250 to the MEMS platform may be carried out in a variety of ways. In accordance with one embodiment of the present technology, a particularly robust connection of tire rotation sensitive piezoelectric sensor 250 may be provided by physically mounting sensor 250 in MEMS enclosure 210 as illustrated in FIG. 2. Such mounting methods also facilitate the desirable aspect of providing a completely sealed environment to protect the sensors and all other associated MEMS platform components from the contaminating effects of tire enclosed chemicals as previously discussed. Alternative mounting and signal coupling methodologies are contemplated, however, with respect to additional embodiments of the present technology.

Figure 3:
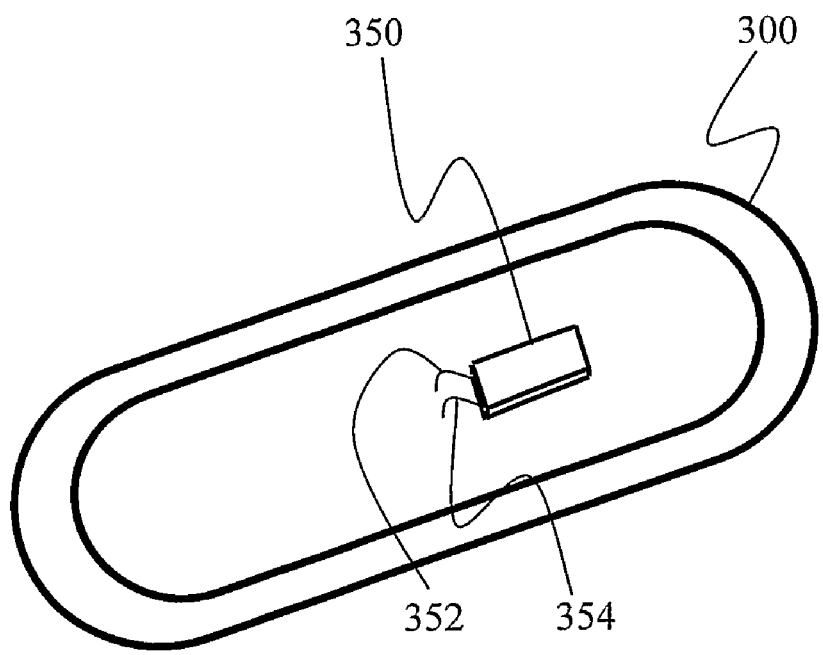
FIG. 3 illustrates an alternative methodology for associating a piezoelectric tire rotation sensor with a MEMS platform patch and providing signal coupling to the MEMS platform.

With reference to FIG. 3, there is illustrated one such additional embodiment of the present technology wherein a tire rotations sensitive piezoelectric sensor 350 may be embedded on or within a MEMS platform patch 300. In this embodiment of the present technology signals from the piezoelectric sensor 350 may be communicated to the tire electronics associated with the MEMS platform by way of direct wire connections 352, 354. The piezoelectric sensor 350 may be affixed to the patch 300 before mounting the patch 300 to a tire and be configured with a wire pigtail to be attached to a thru-case connector on the MEMS enclosure. Alternatively the pigtail could be attached to the MEMS enclosure and connected to the piezoelectric sensor contacts using solder or a conductive epoxy.

In yet another embodiment of the present technology, a direct connection from the piezoelectric sensor 350 to the MEMS enclosure electronics may be established by providing the piezoelectric sensor 350 as an external package with leads 352, 354 configured as surface contacts configured to cooperate with matching spring loaded contacts on the MEMS patch 300. The electrical connection in such a configuration may be sealed or enhanced using a conductive rubber adhesive or grease.

Figure 4:
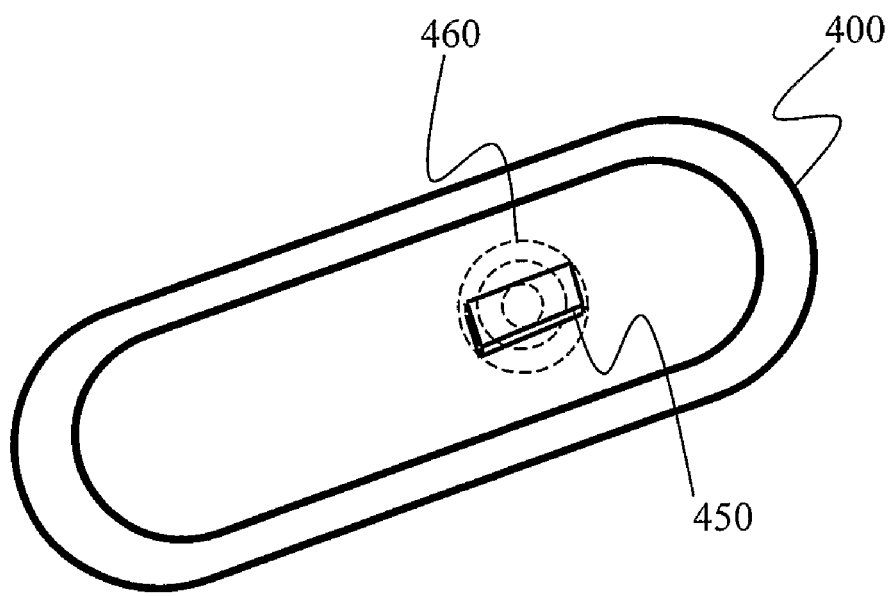
FIG. 4 diagrammatically illustrates additional alternative methodologies for associating a piezoelectric tire rotation sensor with a MEMS platform patch and providing signal coupling to the MEMS platform.

With reference to FIG. 4, there are diagrammatically illustrated additional embodiments of the present technology all involving non-contact methodologies for coupling signals from a piezoelectric sensor 450 embedded on or within a MEMS platform patch 400. Each of these additional embodiments of the preset technology contemplates wireless signal coupling methodologies for coupling signals from piezoelectric sensor 450 to the electronics contained within the MEMS platform patch 400, all of which are diagrammatically illustrated by representatively illustrated energy waves 460.

In a first wireless signal transmission methodology, the piezoelectric sensor 450 may be embedded on or within MEMS platform patch 400 along with an electronic circuit configured to transmit radio frequency (RF) on-off signals to a corresponding receiver (not shown) on the MEMS circuit board 260. In this instance, the RF transmission would require that operating power for the transmitter circuit be harvested from the piezoelectric sensor 450, but only minimal energy would need to be harvested as the transmission distance would generally be less than one inch and the corresponding receiver on the MEMS circuit board would only need to detect presence, or not, of the signal.

A first variation of this embodiment of the present technology would replace the RF transmission methodology for transmitting signals from piezoelectric sensor 450 to the MEMS circuit board just discussed with a low frequency transmission. In such an alternate embodiment, the power generated by deflection of the piezoelectric sensor 450 would be conditioned and discharged through an inductor. A matching inductor on the MEMS circuit board, in cooperation with the inductor coupled to the piezoelectric sensor 450 would function as an air-core transformer to couple signals from the piezoelectric sensor 450 to the electronics contained on the MEMS circuit board.

With further reference to FIG. 4, yet another embodiment of the present technology is also diagrammatically represented in that the illustrated energy waves 460 are intended to represent also the use of optical transmission of signals from piezoelectric sensor 450 to the electronics contained on the MEMS circuit board 260. Such optical transmission may be configured in two different formats, one taking the form of an infra-red light emitting diode (LED) mounted with the piezoelectric sensor 450 and a corresponding photo-transistor mounted on the MEMS circuit board. It is recognized that in this embodiment of the present technology that under certain circumstances a tire of the earthmover variety as presently contemplated may contain liquids that would attenuate the optical signal, such attenuation is offset by the fact that the interior of the tire is very dark, permitting use of a very sensitive photo element.

Yet a further optical signal transmission embodiment of the present technology may be realized by employing an electro-luminous panel as an alternative to the previously mentioned LED. In this embodiment of the present technology, a piezoelectric sensor may be configured such that a piezoelectric element is mounted on one side of a substrate while an electro-luminous panel is affixed to the other side of the substrate. The assembly may then be affixed to the patch 400 and oriented to allow transmission of optical signals to a phototransistor mounted on the MEMS circuit board in a manner similar to that discussed with respect to the LED configured embodiment previously described.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire environment monitoring system, comprising:
   an enclosure;
   a circuit board housed within said enclosure;
   a signal transmitter;
   a tire environment sensitive sensor housed within said enclosure, said tire environment sensitive sensor configured to provide tire environment related signals to said signal transmitter ;
   an elastomeric material surrounding said enclosure; and
   a piezoelectric sensor physically coupled to said enclosure and configured to provide multidimensional strain induced signals to said signal transmitter; the multidimensional strain induced signals being indicative of one or more tire motion related parameters.

2. The tire environment monitoring system of claim 1, wherein said piezoelectric sensor is coupled to said enclosure through said elastomeric material and wherein said piezoelectric sensor is configured to provide strain induced signals directly to a portion of said circuit board.

3. The tire environment monitoring system of claim 1, further comprising:
   a light emitting element coupled to said piezoelectric sensor; and
   a light sensitive element coupled to a portion of said circuit board,
   whereby said piezoelectric sensor is configured to provide strain induced signals to a portion of said circuit board through an optical path established between said light emitting and light sensitive elements.

4. The tire environment monitoring system of claim 1, further comprising:
   a first inductive element coupled to said piezoelectric sensor; and
   a second inductive element coupled to a portion of said circuit board,
   whereby said first and second inductive elements are configured as an air-core transformer to provide strain induced signals to a portion of said circuit board through a magnetic path established between said first and second inductive elements.

5. The tire environment monitoring system of claim 1, further comprising:
   a radio frequency transmitter coupled to said piezoelectric sensor; and
   a radio frequency receiver coupled to a portion of said circuit board,
   whereby strain induced signals are coupled to a portion of said circuit board through an electro-magnetic path established between said radio frequency transmitter and said radio frequency receiver.

6. A method for producing tire rotation responsive signals, comprising the steps of:
   providing a tire;
   providing an enclosure;
   associating a piezoelectric sensor with said enclosure;
   providing a signal processor to process signals generated by said piezoelectric sensor to provide signals indicative of one or more tire motion related parameters; and
   mounting said enclosure in said tire in a position subject to multidimensional strain upon tire rotation.

7. The method of claim 6, further comprising the step of:
   encasing said enclosure in an elastomeric material, wherein the step of associating comprises associating the piezoelectric sensor with said elastomeric material.

8. The method of claim 6, further comprising the steps of:
coupling a signal transmitter to said piezoelectric sensor; and
coupling a signal receiver to said signal processor,
whereby signals generated by said piezoelectric sensor are conveyed from said piezoelectric sensor to said signal receiver by way of said signal transmitter for processing by said signal processor.

9. The method of claim 8, wherein the step of coupling a signal transmitter to said piezoelectric sensor comprises coupling an electrical conductor to said piezoelectric sensor.

10. The method of claim 8, wherein the step of coupling a signal transmitter to said piezoelectric sensor comprises coupling a light-generating device to said piezoelectric sensor.

11. A method for detecting tire rotation, comprising the steps of:
mounting a strain sensitive sensor in a tire in a position subject to multidimensional strain upon tire rotation; and
processing signals produced by the sensor to isolate tire rotation indicative signals from other signals that are produced upon tire rotation by said strain sensitive sensor;
wherein the step of mounting comprises mounting a piezoelectric sensor in an enclosure housing tire environment related sensors.

* * * * *